US011500991B2

(12) United States Patent
Höfele et al.

(10) Patent No.: US 11,500,991 B2
(45) Date of Patent: Nov. 15, 2022

(54) METHOD AND SYSTEM FOR PROVIDING SECURITY INFORMATION ABOUT AN APPLICATION CONTAINER FOR AN INDUSTRIAL EDGE DEVICE

(71) Applicant: Siemens Aktiengesellschaft, Munich (DE)

(72) Inventors: Markus Höfele, Mannheim (DE); Peter Kob, Heroldsberg (DE); Rolf Schrey, Mönchengladbach (DE); Armin Zeltner, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 146 days.

(21) Appl. No.: 16/931,656

(22) Filed: Jul. 17, 2020

(65) Prior Publication Data

US 2021/0019416 A1 Jan. 21, 2021

(30) Foreign Application Priority Data

Jul. 18, 2019 (EP) ..................... 19187044

(51) Int. Cl.
*G06F 21/00* (2013.01)
*G06F 21/57* (2013.01)

(52) U.S. Cl.
CPC ........ *G06F 21/57* (2013.01); *G06F 2221/033* (2013.01)

(58) Field of Classification Search
CPC .. G06F 21/57; G06F 2221/033; G06F 21/563; G06F 21/50
See application file for complete search history.

(56) References Cited

U.S. PATENT DOCUMENTS

2013/0227683 A1 8/2013 Bettini et al.
2017/0230378 A1* 8/2017 Bliss ................... H04L 63/0428
(Continued)

FOREIGN PATENT DOCUMENTS

DE 102018200390 7/2019

OTHER PUBLICATIONS

EP Search Report dated Jan. 20, 2020 based on EP19187044 filed Jul. 18, 2019.

*Primary Examiner* — Ghazal B Shehni
(74) *Attorney, Agent, or Firm* — Cozen O'Connor

(57) ABSTRACT

A method and a system for providing security information about an application container for an Industrial Edge device, wherein the application container displays an application, runtime libraries and parts of an execution environment, where first information is obtained from the application or source code, second information is obtained from the application program or source code of the application, where confidentiality classes and processing classes are ascertained, and where the security information is formed by linking arising confidentiality classes to arising processing classes and the security information is associated with the application container such that specific and reliable security information about the application container or applications is generated and the security information is provided to a user or an installation system via association of the security information with the application container or the application to make information about the specific security problems or properties available before an application is used.

20 Claims, 2 Drawing Sheets

(56) References Cited

U.S. PATENT DOCUMENTS

2018/0039779 A1 2/2018 Li et al.
2018/0129805 A1* 5/2018 Samuel .................. H04L 63/20

* cited by examiner

METHOD AND SYSTEM FOR PROVIDING SECURITY INFORMATION ABOUT AN APPLICATION CONTAINER FOR AN INDUSTRIAL EDGE DEVICE

BACKGROUND OF THE INVENTION

1. Field of the Invention

The invention relates to a system and method for providing security information about an application container for an Industrial Edge device.

2. Description of the Related Art

Within industrial automation arrangements, read and write access to data of the automation components, such as industrial controllers, of the operating and observation devices (Human machine Interface (HMI) devices), recipe data, planning data and the like, is always a security-critical process. While production data or recipes for products are usually confidential and therefore either cannot be made available outside the industrial automation arrangement at all or can be made available only under certain conditions, write access to such systems, in particular to actuators, can cause considerable damage if abused.

Often, modern automation systems cannot manage without data interchange with a public data network, however; in particular, a large amount of automation data is processed in what is known as the "cloud", i.e., on external servers, which are accessible via the Internet, for example. What are known as Edge devices are therefore preferably used at the interface between a "private" automation network, in which the industrial controllers, such as HMI devices, are arranged, and a public network, in particular the Internet or a "cloud". These are components that have both a data channel to the automation network and a further data channel to the public network, i.e., particularly the "cloud". First, the Edge devices are used to provide the automation components with computation power for data processing services. Second, it is a task of the Edge devices to cause and possibly control the data interchange between the automation network and the cloud. In particular, applications on Edge devices are configured to aggregate data from the automation network, process the data and to make the results available in the cloud, for example, in order to provide a headquarters of a global company with utilization data about local production sites, and the like.

The application programs producing the functionality of the Edge devices are frequently provided as what are known as application containers, these application containers usually being called "apps" (for "application") for short, analogously to the applications for mobile communication devices. Such application containers are thus known in principle from mobile phones and other devices. They comprise not only the actual application program but also the runtime libraries necessary for execution and parts of the execution environment, in particular additions to an operating system. An example are the conventional "docker containers", which can be installed on Edge devices in a respective dedicated runtime environment, and which then have connectivity to the local automation network and to interfaces to public networks (cloud) via the basic functionality of the Edge devices. Such application containers or apps are provided via application memories, known as app stores or "repositories". Various providers of software can provide such apps or application containers for a wide variety of purposes and usually in return for payment of a use fee, such that an administrator can easily program the Edge devices with a wide variety of applications.

In particular, for the industrial application presented here, the apps need to meet specific security requirements and data processing specifications ("policies"). Before a user or an administrator loads such an app from the application memory (app store), the app must be checked before use to establish whether all component parts of the app are permitted to be used with regard to their potential security risk to the confidentiality of local data and the like.

From the specific application of mobile phones and the applications used thereon, it is a known practice for use to be preceded by an information page being displayed to the user that provides information about whether certain peripherals, such as a camera or microphone or loudspeaker, are supposed or permitted to be used, and whether data of the personal address book and the like, for example, are accessed.

The information known from this specific application about the access rights of the app is usually provided by the manufacturer of the app. Furthermore, a user can deny or enable the use of certain peripheral units, such as a camera or, microphone, or else permit or prohibit access to data of the device, such as an address book.

One problem is that the known information about the use of confidential data information requires the manufacturer of the app to be trusted, because the information presented normally originates from this manufacturer. Although there are checks by the operator of the app store, these are normally performed on a random basis and essentially manually.

SUMMARY OF THE INVENTION

In view of the foregoing, it is an object of the invention to provide a method and system for reliably classifying presented apps or application containers with respect to their potential security risk and to provide this information to a user for use in the industrial realm of app devices.

This and other objects and advantages are achieved in accordance with the invention by a method for providing security information about an application container for an Industrial Edge device, where the application container contains an application program, runtime libraries and/or parts of an execution environment, in particular of an operating system. Information about the data accessed by the application program, in particular data points of an industrial controller linked to the Edge device or of a cloud application in a public cloud network, is initially obtained from the application program or a source code of the application program in a first step, where second information about the runtime libraries used in the application container for accessing the data or for processing the data and/or about parts of the execution environment is obtained from the application program or the source code of the application program in a second step, where confidentiality classes associated with the first information and processing classes associated with the second information are ascertained in a third step, and where the security information is formed by linking the arising confidentiality classes to the arising processing classes, and the security information is associated with the application container, in a fourth step. The method in accordance with the invention can be used to generate specific and reliable security information about the application containers or apps and to provide the security information to a user or an installation system via an association of the security information with the application container or the app, such that information about the specific security problems or properties is available before the app is used.

A central concept of the way the objects in accordance with the invention is achieved is both to analyze which data, in particular data points of an industrial controller or of an industrial operating and observation device, the applicable application or app accesses and secondly to analyze what happens with these data, i.e., specifically which programs, subroutines and library functions are used to process these data, and if necessary which interfaces are used to provide data to which addressees. Essentially, the importance or confidentiality of the data to be processed and the type of data processing or forwarding result in a greater or lesser security risk or an applicable "exposure" (target) to attacks and abuse. This classification, which is intended to be accomplished essentially automatically, is then converted into a classification either of the entire application or at least of sub-functions of the app, for example, in the style of traffic lights or a risk classifier.

It is also an object of the invention to provide a system for providing security information about an application container for an Industrial Edge device, where the application container comprises an application program, runtime libraries and/or parts of an execution environment, in particular of an operating system, and where the system is programmed by certification software. The certification software obtains first information about the data accessed by the application program, in particular data points of an industrial controller linked to the Edge device or a cloud application in a public cloud network, from the application program or a source code of the application program in a first step, where second information about the runtime libraries used in the application container for accessing the data or processing the data and/or about parts of the execution environment is obtained from the application program or the source code of the application program in a second step, where confidentiality classes associated with the first information and processing classes associated with the second information are ascertained in a third step, and where the security information is formed by linking the arising confidentiality classes to the arising processing classes, and the security information is associated with the application container, in a fourth step. Such a system allows the advantages already discussed on the basis of the method to be achieved.

Advantageously, the method is performed automatically by certification software running on a computer, i.e., the system not only ascertains the security information but also uses certification to confirm by whom the certification has been performed. Advantageously, the certificate is inseparably connected both to the security information and to the application container or the app, such that manipulation of both the software and the security certificate can be detected. As a result of the analysis of the security being based on an analysis of the source text (source code), whereas the accordingly created security certificate is advantageously associated with the executable program code compiled therefrom, confidentiality requirements of a manufacturer of the software, who would not ordinarily wish to publish the source code, can be taken into consideration as appropriate. This is the case in particular if the automatic certification is effected by a trusted, neutral entity such as a technical control board.

For the data used, the categorization with respect to confidentiality can be effected in a class-based manner (confidentiality classes). Analogously, processing classes can also be defined for the modules for data processing (e.g., runtime libraries). Such classes can be described by numbers, for example, which means that, in a simple case, a level of threat can easily be formed for a specific variable, a data point or other confidential information via a multiplication between a confidentiality class and a processing class. The security information or risk class thus formed can be formed for many or all data under consideration, such that either a total number or overall assessment can be formed in a collective analysis in the style of traffic lights or the like, or more detailed information containing minimum values, maximum values and emphasis of the most critical points can be provided. In particular, it is advantageously possible to publish the security information in the form of a machine-readable data record, such as an XML file. In order to be able to classify the data or the data processing means, descriptive information, known as meta information, can be accessed, for example, which is already added to many data and programs or libraries anyway, often also in machine-readable form. A simple option furthermore also arises by virtue of the variable names ("tag descriptors") of data points or local variables of an automation system, on the one hand, and names for data processing routines, on the other hand, being analyzed, because such names often consist of structured details in hierarchic form.

Depending on the requirements profile for the security analysis, it can be important whether data are handled via read or write access. As such, in industrial production plants, such as a chemical plant, write access to actuators is much more critical for safety of operation than read access to state information. From the point of view of information security, however, read access to confidential information is naturally more critical than write access to display means or monitors, for example. The information about whether data are processed via read or write access is often also obtained from the type of a library element, i.e., of a program block or the like. As such, program blocks that are used for visualizing data, for example, are usually data-consuming units, i.e., have read access. Control modules often have read and write access.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is illustrated below on the basis of the drawings, wherein the exemplary embodiments are simultaneously used to illustrate a system in accordance with the invention, in which.

DETAILED DESCRIPTION OF THE EXEMPLARY EMBODIMENTS

Figure 1:
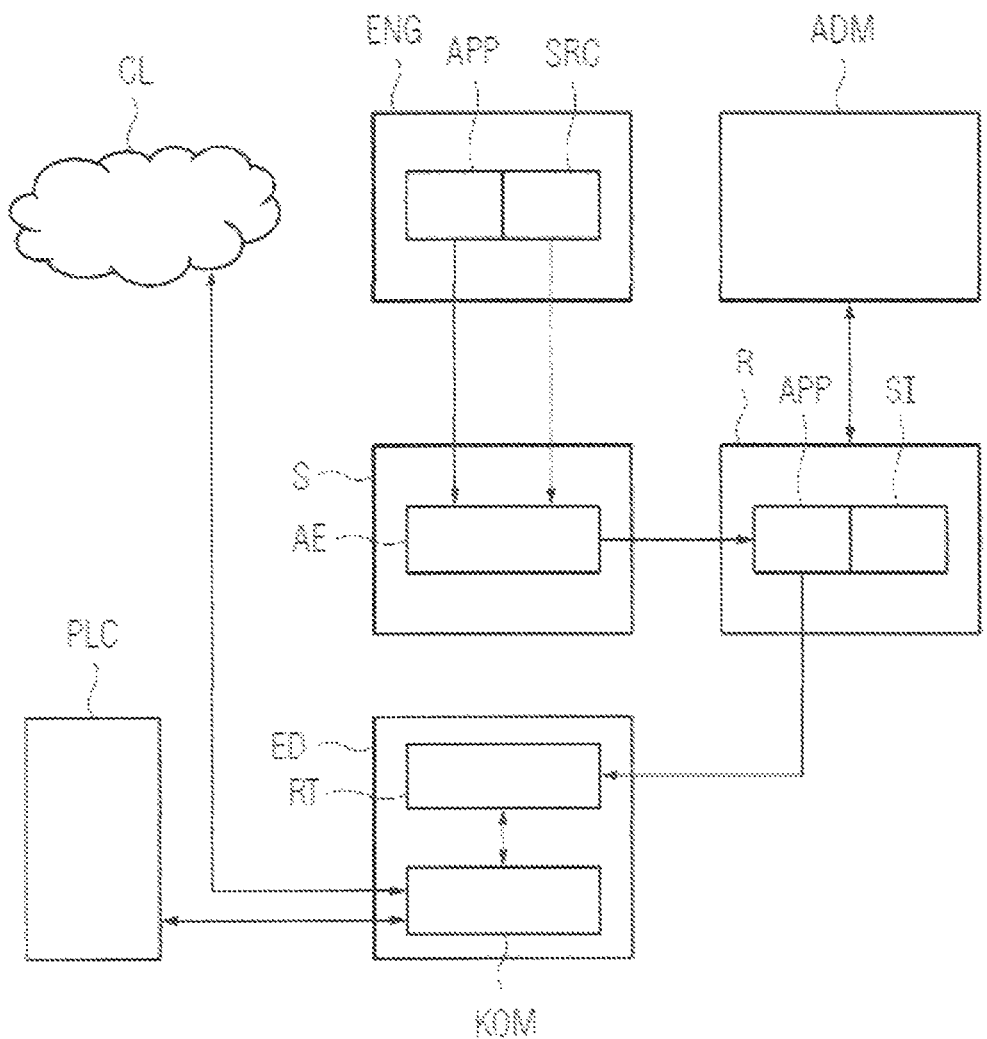
FIG. 1 is a schematic depiction of an engineering system for creating or programming an application container (called app below), a system for producing security information about the app, an application memory for storing and distributing apps, an administrator workstation, an Edge device, a programmable logic controller and a public network, i.e., a "cloud", in accordance with the invention.

With reference to FIG. 1, an engineering system ENG, i.e., a programmable workstation, is used to create an application container APP for execution on the Edge device ED. Both the executable app, i.e., the (compiled) object code, which can also comprise runtime libraries and other elements of the execution environment through to the complete operating system, and the relevant source code SRC, are provided to the system S for checking. In the present exemplary embodiment, the system S is a technical device belonging to a trusted entity. Specifically, the system is a computer or server upon which an analysis program AE (assessment engine) is realized. This checks the source code SRC, in particular. However, it can also be ensured that the object code, i.e., the application container APP, results from precisely the source code SRC that is the subject of the check.

The analysis device AE then analyzes the source code SRC, this advantageously being accomplished via a multistage method. In a step for analyzing the data access operations, a table of those data or data points to which the app effects read or write access is created. These can be variables (known as data points) of the programmable logic controller PLC, or they can relate to other data of either an automation network (in which the controller PLC is arranged) or other data sources or sinks. The sensitivity of the accessed data or data points is classified. In the present exemplary embodiment, this is accomplished based on the variable names, which are often of hierarchic design in programmable logic controllers and other industrial components. As such, what is known as a "tag" having the name Motor.temp reveals that a sensor value for temperature information associated with a technical device (motor) is involved. Such information is usually not particularly confidential, for example, can be classified with the value 2 on a scale from 0 to 10 (0=noncritical, 10=highly critical).

The methods for data processing and data use are sought and classified in a second pass. As such, a "Chart.View" routine can be found in the exemplary embodiment, the name indicating that this can be used to graphically display data. With respect to protection against manipulation, purely displaying data is noncritical, i.e., can be rated 0 on a scale from 0 to 10 (0=noncritical, 10=highly critical), for example. With respect to data integrity for the purposes of data protection or confidentiality, display is critical, however, but not as critical as publication in a public network. In the example, a classification of 6 could result. If the analyzed "tag" "Motor.temp" and the program unit "Chart.View" are now linked to one another in the software, the applicable pieces of classification information are related to one another, e.g., multiplied, such that a value of 12 can result in this case. The theoretical minimum value is 0, where the achievable maximum value is 10×10=100. Risk information or security information SI that is moderate is thus obtained for this datum.

The entire application container APP can be analyzed in the manner outlined. Single values can be used to produce various total values that lead to a more or less abstracted overall view, depending on the purpose and configuration of the system. It is thus possible to display one set of "risk traffic lights" for data integrity and a further set of risk traffic lights for protection against manipulation, for example.

The security information SI thus produced is put into the application memory R (repository, app store) together with the executable part of the software, i.e., the application container APP. The application memory R is regularly filled with a multiplicity of application containers from a wide variety of manufacturers, an administrator workstation ADM being able to select applications (apps), if necessary to purchase them and to determine them for transmission to the destination, namely the Edge device ED. Advantageously, the transmission of the purchased app proceeds directly between the application memory R and the Edge device ED. There, the application container APP is loaded into a runtime environment RT and executed. The execution environment RT usually accesses communication device KOM of the Edge device ED, which firstly means that there is a connection to an automation network having the programmable logic controller PLC, and secondly means that communication with a public network, the cloud CL, is possible.

The process of selecting and, if necessary, purchasing the applications or the application container APP involves the security information SI being displayed on the workstation of the administrator ADM in a screen output. One option is for this to be achieved in the form of generalized information in the style of traffic lights (red=high risk, green=low risk), but usually the different data under consideration are combined into classes (sensor data, actuator data or business data), such that more detailed information is possible. On the one hand, the operator of the workstation ADM (administrator) can take this information as a basis for deciding whether the application container APP meets his demands. In an advantageous embodiment, however, it is also possible for data processing modules (for example, for presenting information, for transmitting data, log functions, etc.) to be disabled or enabled individually. This disabling information or enabling information is then transmitted together with the application container APP to the runtime environment RT, where it is taken into consideration as appropriate.

In additional work steps (not depicted), it is possible to check whether the application container APP and the associated security information SI have been certified in a valid manner, by whom they have been certified and/or for how long the certificate is valid. It is therefore possible to classify the communication behavior (connectivity) of an application (APP) and the access to sensitive data automatically and to provide this information.

Figure 2:
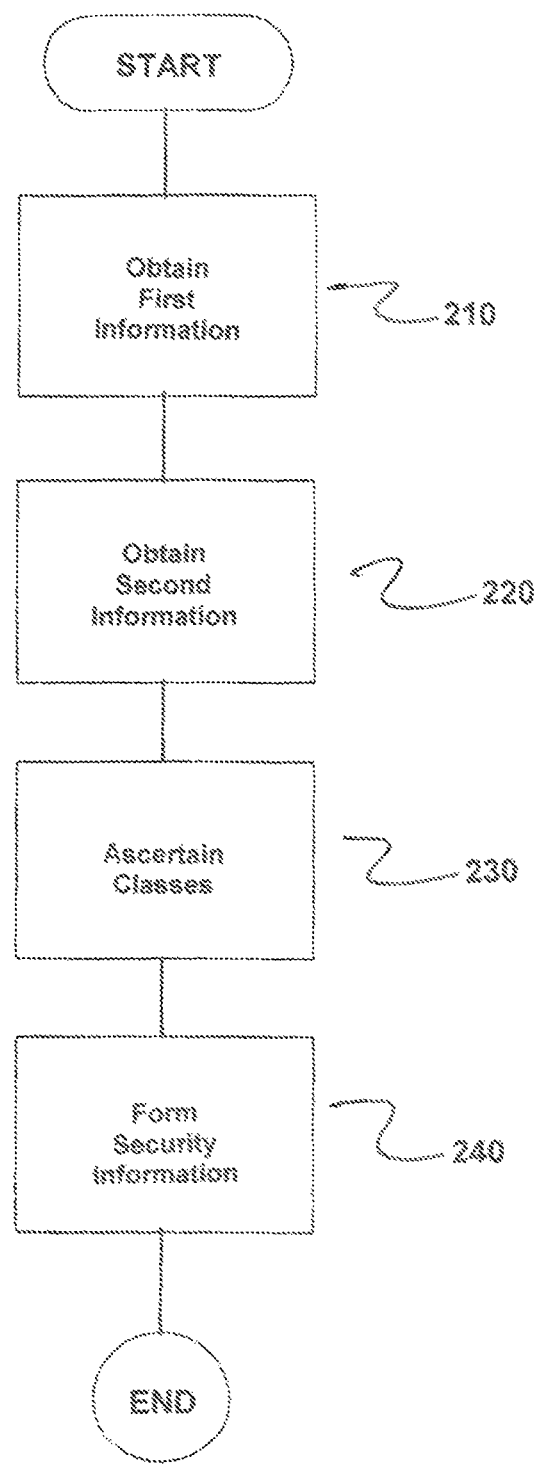
FIG. 2 is a flowchart of the method in accordance with the invention.

FIG. 2 is a flowchart of a method for providing security information SI about an application container APP for an Industrial Edge device ED, where the application container APP comprises at least one of an application program, runtime libraries and parts of an execution environment RT. The method comprises obtaining, by a computer, first information about data accessed by the application program comprising data points of either an industrial controller linked to the Edge device or a cloud application in a public cloud network, from the application program or a source code SRC of the application program, as indicated in step 210.

Next, the computer obtains second information about either the runtime libraries utilized in the application container APP for accessing the data and/or processing the data and/or parts of the execution environment RT from the application program or the source code SRC of the application program, as indicated in step 220.

Next, the computer ascertains confidentiality classes associated with the first information and processes classes associated with the second information, as indicated in step 230.

Next, the computer forms the security information SI by linking arising confidentiality classes to arising processing classes, and associates the security information with the application container APP, as indicated in step 240.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing security information about an application container for an Industrial Edge device, the application container comprising at least one of an application program, runtime libraries and parts of an execution environment, the method comprising:
   obtaining, by a computer, first information about data accessed by the application program comprising data points of one of (i) an industrial controller linked to the Edge device and (ii) a cloud application in a public cloud network, from the application program or a source code of the application program;
   obtaining, by the computer, second information about the runtime libraries utilized in the application container for accessing or processing the data;
   ascertaining, by the computer, confidentiality classes associated with the first information and processing classes associated with the second information about the runtime libraries utilized in the application container; and
   forming, by the computer, the security information by linking arising confidentiality classes to arising processing classes, and associating said security information with the application container.

2. The method as claimed in patent claim 1, wherein the method is performed automatically by certification software executing on the computer; and wherein the certification software accesses source code for the application container (APP) or of the application program.

3. The method as claimed in patent claim 1, wherein the confidentiality classes are associated automatically during said ascertaining based on descriptive information of one of (i) a respective datum of the data, (ii) a respective data point of the data and (iii) from a structured name comprising a data point name or variable name of the data.

4. The method as claimed in patent claim 2, wherein the confidentiality classes are associated automatically during said ascertaining based on descriptive information of one of (i) a respective datum of the data, (ii) a respective data point of the data and (iii) from a structured name comprising a data point name or variable name of the data.

5. The method as claimed in patent claim 1, wherein the respective processing class of an element of one of (i) the runtime library and (ii) a part of the execution environment is ascertained automatically during said ascertaining from one of (i) a description associated with the respective element, (ii) a structured name of the respective element and (iii) a functionality of the respective element.

6. The method as claimed in patent claim 1, wherein the respective linking of a confidentiality class to a processing class during said forming the security information by the computer involves taking into consideration whether at least one of (i) read or write access to the respective data is effected and (ii) the respective data or data points are associated with a private automation network or with a public network comprising a public cloud.

7. The method as claimed in patent claim 1, wherein at least one risk class is determined as the security information during said forming the security information from a plurality of links between confidentiality classes and processing classes.

8. The method as claimed in patent claim 1, wherein the execution environment comprises an operating system.

9. A system for providing security information about an application container for an Industrial Edge device (ED), the application container comprising at least one of (i) an application program, (ii) runtime libraries and (iii) parts of an execution environment, the system comprising:
   a computer including a processor and memory storing certification software;
   wherein the computer configures the system such that:
      first information about the data accessed by the application program, said data comprising data points of an industrial controller linked to the Edge device or of a cloud application in a public cloud network, is obtained from the application program or a source code of the application program;
      second information about the runtime libraries utilized in the application container for one of accessing or processing the data;
      confidentiality classes associated with the first information and processing classes associated with the second information about the runtime libraries utilized in the application container are ascertained; and
      the security information is formed by linking arising confidentiality classes to arising processing classes, and said security information is associated with the application container.

10. The system as claimed in patent claim 9, wherein the system is programmed such that a method is performed automatically by the certification software executing on the computer; and wherein the certification software accesses source code for the application container or of the application program.

11. The system as claimed in patent claim 9, wherein the system is programmed such that the confidentiality classes are associated automatically during said ascertainment of said confidentiality classes and said processing classes based on descriptive information of one of (i) a respective datum of the data, (ii) a respective data point of the data and (iii) a structured name comprising a data point name or variable name of the data.

12. The system as claimed in patent claim 10, wherein the system is programmed such that the confidentiality classes are associated automatically during said ascertainment of said confidentiality classes and processing classes based on descriptive information of one of (i) a respective datum of the data, (ii) a respective data point of the data and (iii) a structured name comprising a data point name or variable name of the data.

13. The system as claimed in patent claim 9, the system is programmed such that the respective processing class of an element of one of (i) a runtime library and (ii) a part of the execution environment is ascertained automatically said ascertainment of said confidentiality classes and processing classes from one of (i) a description associated with the respective element, (ii) a structured name of the respective element and (iii) a functionality of the respective element.

14. The system as claimed in patent claim 10, the system is programmed such that the respective processing class of an element of one of (i) a runtime library and (ii) a part of the execution environment is ascertained automatically said ascertainment of said confidentiality classes and processing classes from one of (i) a description associated with the respective element, (ii) a structured name of the respective element and (iii) a functionality of the respective element.

15. The system as claimed in patent claim 9, the system is programmed such that the respective processing class of an element of one of (i) a runtime library and (ii) a part of the execution environment is ascertained automatically said ascertainment of said confidentiality classes and processing classes from one of (i) a description associated with the respective element, (ii) a structured name of the respective element and (iii) a functionality of the respective element.

16. The system as claimed in patent claim 9, wherein the system is programmed such that the respective linking of a confidentiality class to a processing class during said forming of the security information involves taking into consideration whether at least one of (i) read or write access to the respective data is effected and (ii) the respective data or data points are associated with one of (i) a private automation network and (ii) a public network comprising a public cloud.

17. The system as claimed in patent claim 9, wherein the system is programmed such that at least one risk class is determined during said forming of the security information from a number of links between confidentiality classes and processing classes.

18. The system as claimed in patent claim 9, wherein the system is programmed such that the application container is one of (i) automatically enabled and (ii) automatically disabled for use with the Edge device based on the security information.

19. The system as claimed in patent claim 18, wherein one of (i) the system and (ii) the Edge device stores information about requirements for the security information, said stored information being compared with the security information associated with the respective application container automatically for a decision about said automatic disabling or enabling.

20. The system as claimed in patent claim 9, wherein the execution environment comprises an operating system.

* * * * *